(12) United States Patent
Szu et al.

(10) Patent No.: US 6,321,611 B1
(45) Date of Patent: Nov. 27, 2001

(54) LINEAR ACTUATOR TRAVEL LIMIT APPARATUS

(75) Inventors: Kou-I Szu; Wei-Min Chiou; Chi-Yung Cheng, all of Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 09/588,734

(22) Filed: Jun. 7, 2000

(30) Foreign Application Priority Data

Nov. 9, 1999 (TW) .............................................. 88219072 U

(51) Int. Cl.[7] .................................................. F16H 25/20
(52) U.S. Cl. ........................ 74/89.37; 192/141; 192/143; 200/47
(58) Field of Search ................................... 74/89.37, 526; 192/141, 143; 200/47; 318/626, 266

(56) References Cited

U.S. PATENT DOCUMENTS

| | | | |
|---|---|---|---|
| 3,682,283 | * 8/1972 | Sato | 192/141 |
| 4,114,747 | * 9/1978 | Eller | 192/141 |
| 4,179,944 | * 12/1979 | Conner | 192/141 |
| 5,346,045 | * 9/1994 | Bennett et al. | |

FOREIGN PATENT DOCUMENTS 0 647 799 A2 * 4/1995 (EP) .

* cited by examiner

Primary Examiner—David A. Bucci
Assistant Examiner—William C Joyce
(74) Attorney, Agent, or Firm—Bacon & Thomas, PLLC

(57) ABSTRACT

A linear actuator utilizing limit switches to implement reliable and effective travel limit functions. The actuator having a robust construction, lower part count, smaller dimension, and lower assembly cost.

3 Claims, 7 Drawing Sheets

LINEAR ACTUATOR TRAVEL LIMIT APPARATUS

BACKGROUND OF THE INVENTION

1. Field of the Invention

This invention relates to a linear actuator and, more particularly to a linear actuator having travel limit function.

2. Description of the Prior Art

A typical actuator of this kind comprises a motor, a screw spindle and a screw nut, a driving tube engaged to the screw nut, and an external tube, which protects the driving tube. In many applications, when the driving tube reaches one of the two preset extreme positions, it is often required that the driving tube is stopped moving.

One known actuator of this type is as illustrated in FIG. 5. A driving tube 3, engaged with a screw nut 4, surrounded by an external tube 2, and two limit switches: shortening limit switch 61 and extending limit switch 62, mounted on a circuit board 6, are located at two extreme positions of the actuator. When driving tube 3 reaches one of the extreme positions, screw nut 4 will trigger one of the limit switches and cut off the motor current, and therefore the driving tube will stop moving outwards or inwards. One of the drawbacks of this solution is that the installation of these limit switches and its control circuit requires a large external tube, and hence increases the dimension of this actuator. Furthermore, assembling limit switches into the external tube is quite time consuming. Finally, for each travel length, a different circuit board is required. This increases part variety, and hence production cost.

The second solution, which implements travel limit function, is by counting the rotational turns of screw spindle. A gear train being connected to the screw spindle, for instance, is used for this counting purpose. When the number of turns is larger than a preset value, i. e. the actuator reaches one of the extreme positions, the gear train will turn off the motor electrically or mechanically. Similar to the previous approach, the gear train needs to be altered when actuator stroke is changed.

The third solution, which implements travel limit function, is by monitoring the current consumed by motor of the actuator. When the driving tube reaches one of the extreme positions, the driving tube or the screw nut will begin to move against an obstacle, and motor current increases tremendously. When the monitored current is larger than the preset value, a control circuit will turn off the motor. A pitfall of this over-current approach is that before motor current reaches the preset current limit, motor torque might already damage the power transmission components, such as screw spindle and nut. This solution requires precise tuning of the current limit for each actuator, and thus increases manufacturing cost.

A further solution, as disclosed in EP 0647799A2, uses internal projections, a spring clip 23 and a bushing 22 as shown in FIG. 6, surrounded by an external tube 2 are used to trigger two opposite oriented limit switches: shortening limit switch 61 and extending limit switch 62. When driving tube 3 reaches shortening limit position, screw nut 4 will push against spring clip 23 and thereby pull external tube 2, which will press the trigger button of the shortening limit switch 61. This will disconnect the motor current and stop driving tube 3. When driving tube 3 reaches extending limit position, screw nut 4 will push the bushing 22, and thereby pull external tube 2, which will release the trigger button of the extending limit switch 62 and stop motor 9. When driving tube 3 is subjected to a vertical force, external tube 2, due to assembly clearance, will bent to one side and might miss the two opposite oriented limit switches 61 and 62 as shown in FIG. 7. This might cause the failure of the travel limit function. Choosing a tighter tolerance will increase friction between external tube 2 and driving tube 3 and indirectly increases power consumption of motor, and also the assembly cost. Furthermore, triggering limit switches solely through projections inside the external tube results in high manufacturing and assembly cost of the external tube.

SUMMARY OF THE INVENTION

The objectives of this invention are to create a linear actuator completed with travel limit function, which compared to the prior art, is independent of travel length, and has a robust construction, lower part count, much smaller dimension and lower assembly cost.

In accordance with these objectives of the invention, this invention uses limit switches to implement reliable and effective travel limit function, which eliminates pitfalls of the over-current approach.

To reduce the diameter of the external tube and dimension of the actuator, two limit switches, both mounted on a circuit board, are situated at one end of the external tube, and will be activated by the screw nut and the end of the external tube. This arrangement makes the limit switch module independent of the stroke length, and therefore reduces manufacturing cost of the external tube.

To simplify the assembly task of the circuit board into the actuator housing, the housing of actuator is specially designed to have insert slots and a protrusion pad, which help to position the circuit board and guide the limit switches during assembly.

Furthermore, the trigger buttons of the limit switches on the circuit board are arranged in a straight line, which parallel to the axis of the external tube, so that their activities are less sensitive to the vertical deformation of the external tube.

BRIEF DESCRIPTION OF THE DRAWINGS

The above mentioned and other objectives, features and advantages of the present invention will become apparent from the following descriptions read in conjunction with the attached drawings, of which.

DETAILED DESCRIPTION OF THE PREFERRED EMBODIMENT

Figure 1:
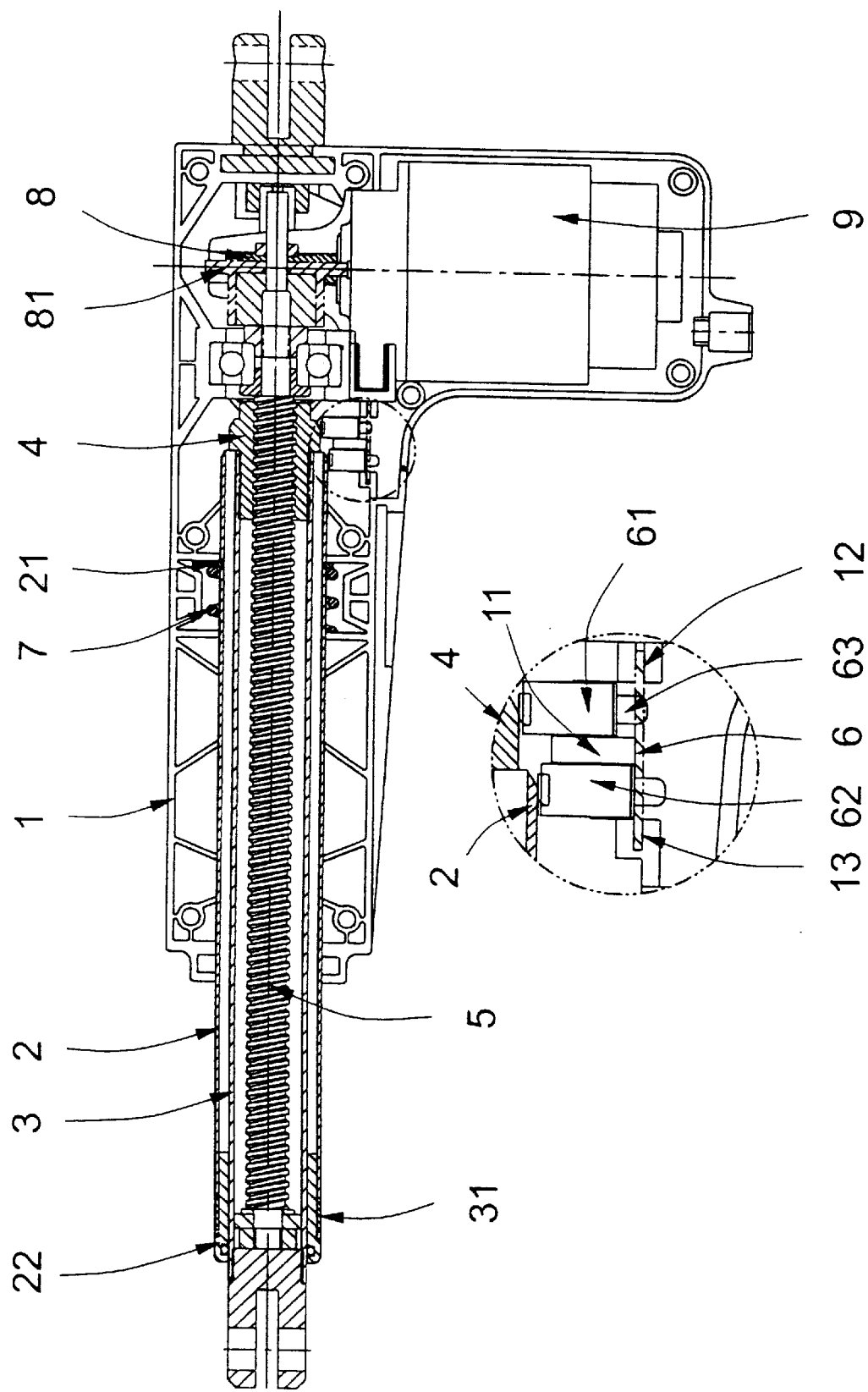
FIG. 1 shows the driving tube at its shortening limit position

FIG. 1 shows a preferred embodiment of the invention where a motor 9 provides power for the actuator. Motor power is transmitted through a worm 8 and a worm wheel 81 to a screw shaft 5. Rotary movement of the screw shaft 5 is further transformed to linear movement by screw nut 4. When driving tube 3, engaged to screw nut 4, reaches the shortening limit position, screw nut 4 will press the trigger button of shortening limit switch 61 and disconnect the current of the motor 9, which will stop the driving tube 3. At this shortening limit position, driving tube 3 can only be driven outwards. As shown in FIG. 1, the trigger button of shortening and extending limit switches 61, 62 are both pressed at this shortening limit position.

Figure 2:
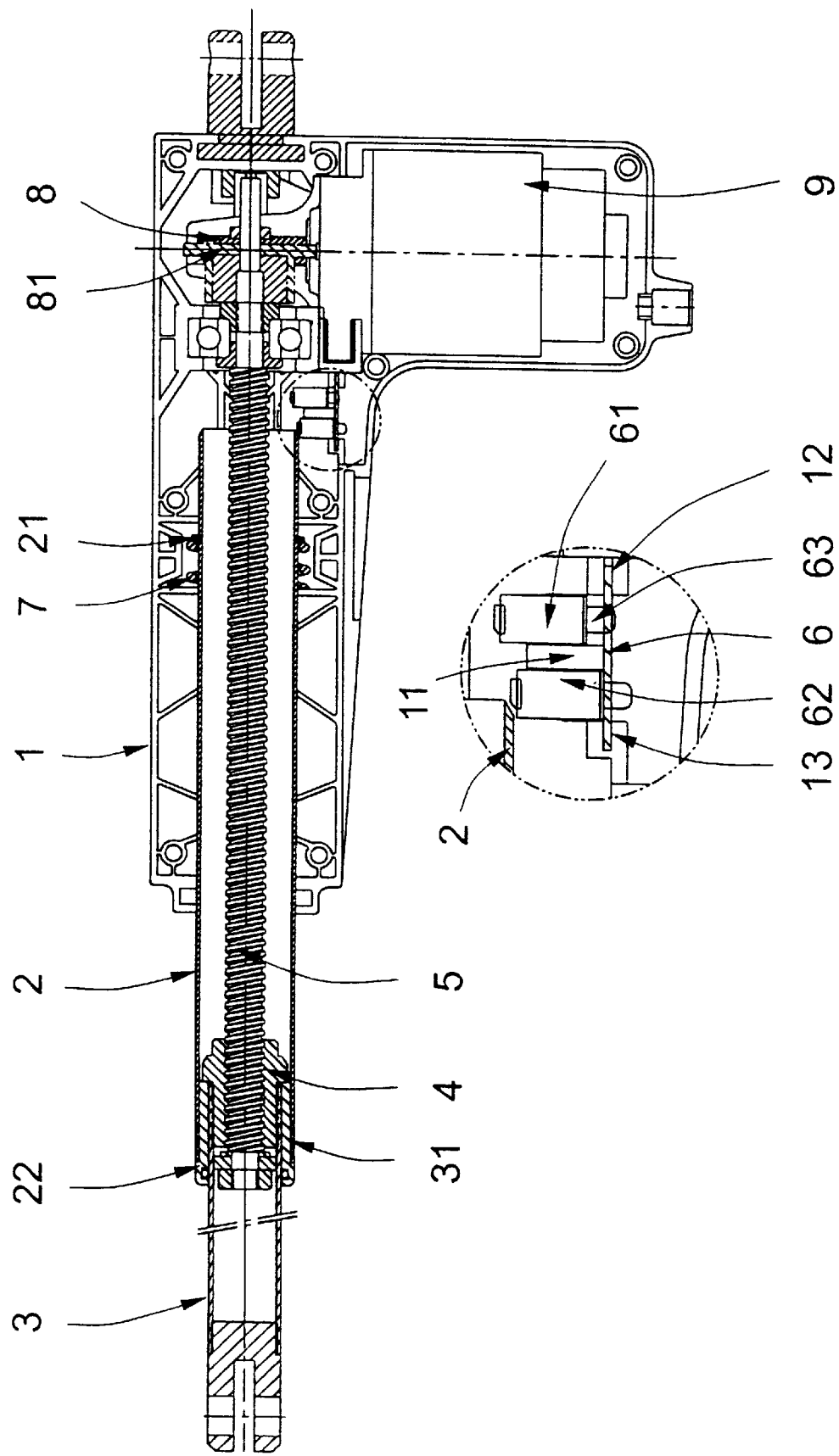
FIG. 2 shows the driving tube at its extending limit position

When driving tube 3 moving outwards, and reaches its extending limit position, as shown in FIG. 2, screw nut 4 will push against an end cap 22 of external tube 2 and force this external tube 2 to move along. A spring clip 21, which fixed on a groove of external tube 2, will press on a compressing spring 7 located in the chamber of the actuator housing 1. The external tube will keep moving outwards until its right end leaves the trigger button of extending limit switch 62 and disconnects the current of motor 9 to stop the driving tube. At this extending limit position, the driving tube can only be driven inwards. As shown in FIG. 2, limit switches 61 and 62 are deactivated. When the actuator is operated in shortening mode, compressing spring 7 will push external tube 2 backwards so that the right end of the external tube contacts again with limit switch 62. This will cause the driving tube again in a position where it can be operated either in outwards or inwards directions. During this circumstance, extending limit switch 62 is activated, and shortening limit switch 61 is deactivated.

To implement the above stated travel limit function, the control logic of limit switches is particularly designed in such a way that:

When shortening limit switch 61 is not activated by screw nut 4 and extending limit switch 62 is activated by the right end of external tube 2, driving tube 3 is able to move outwards or inwards.

When shortening limit switch 61 is triggered by screw nut 4 and extending limit switch 62 is activated by external tube 2, driving tube 3 is only able to move outwards. When both the limit switches are not triggered, driving tube 3 is only able to move inwards.

When shortening limit switch 61 is triggered by screw nut 4 and extending limit switch 62 is not activated by external tube 2, the entire mechanism of actuator might fail, for instance, the compressing spring 7 lost its elasticity. In this case, driving tube 3 will not be driven by motor 9 to avoid further damage caused to actuator.

Figure 3:
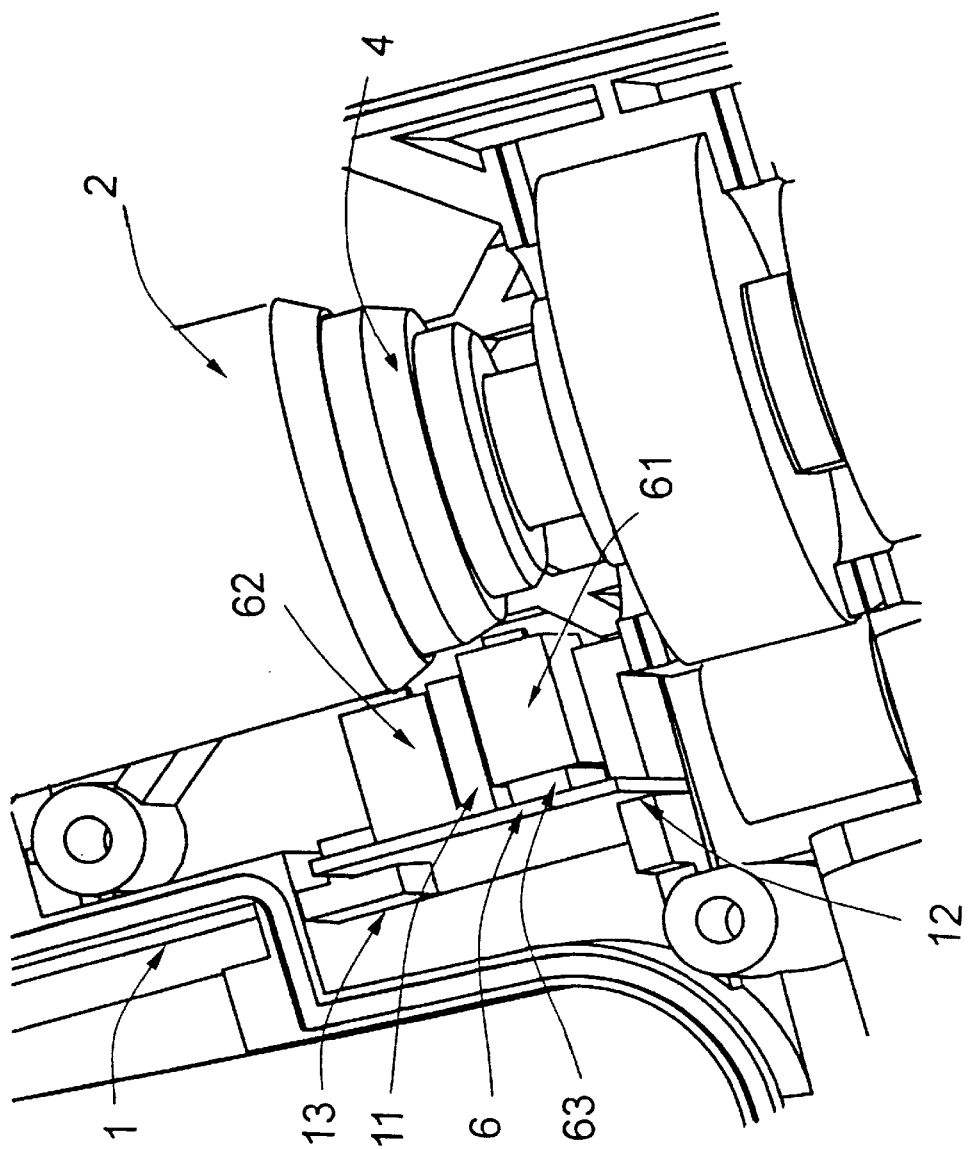
FIG. 3 shows the limit switch circuit board situated in the actuator housing

In this preferred embodiment, as shown in FIG. 3, both limit switches 61 and 62 are mounted on circuit board 6. Between limit switch 61 and circuit board 6 is a spacer 6, so that the position of limit switch 61 is slightly higher than the position of limit switch 62. This is to ensure that the trigger of limit switch 61 by screw nut 4 does not interfere the trigger of limit switch 62 by the external tube.

To simplify the assembly task of circuit board 6 into actuator housing 1, the housing of actuator is specially designed to have insert slots 12, 13 and a protrusion pad 11, which help to position the circuit board and guide the limit switches during assembly. When circuit board 6 is inserted into slots 12 and 13, protrusion pad 11 will separate limit switches 61 and 62, but still remains contact with circuit board 6. This structure ensures that the trigger of limit switches by screw nut 4 and external tube 2 will not remove circuit board 6 from its original position, so that the travel limit function could be secured and guaranteed.

Figure 4:
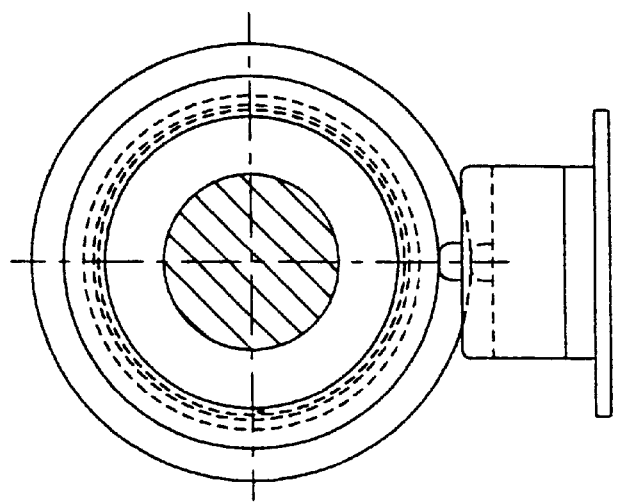
FIG. 4 shows the arrangement of trigger buttons for the limit switches on the circuit board
Figure 4:
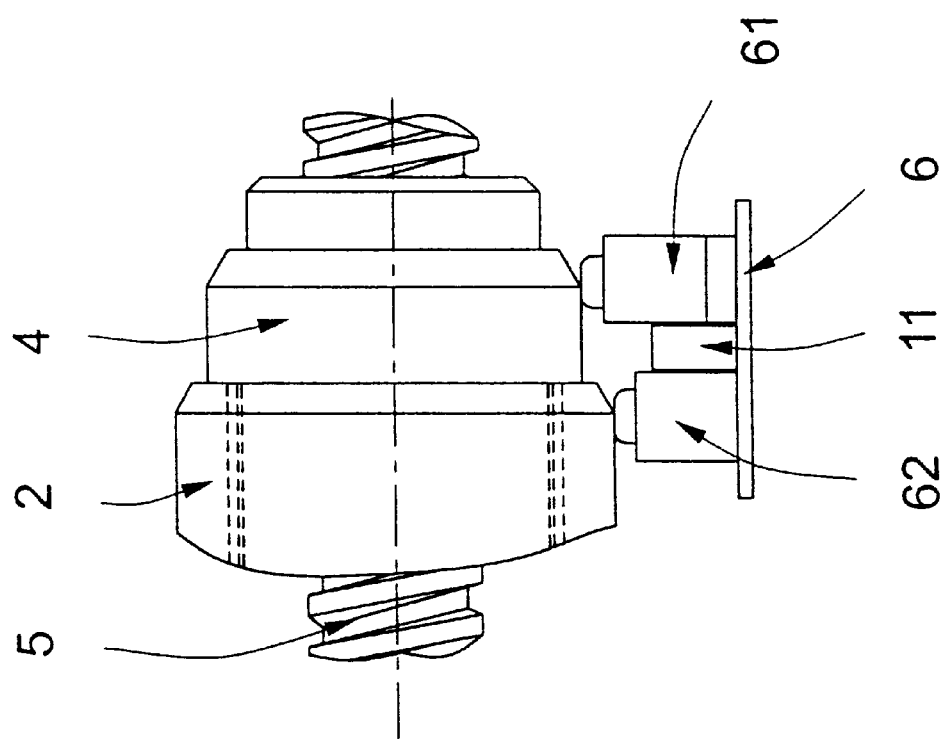
Figure 5:
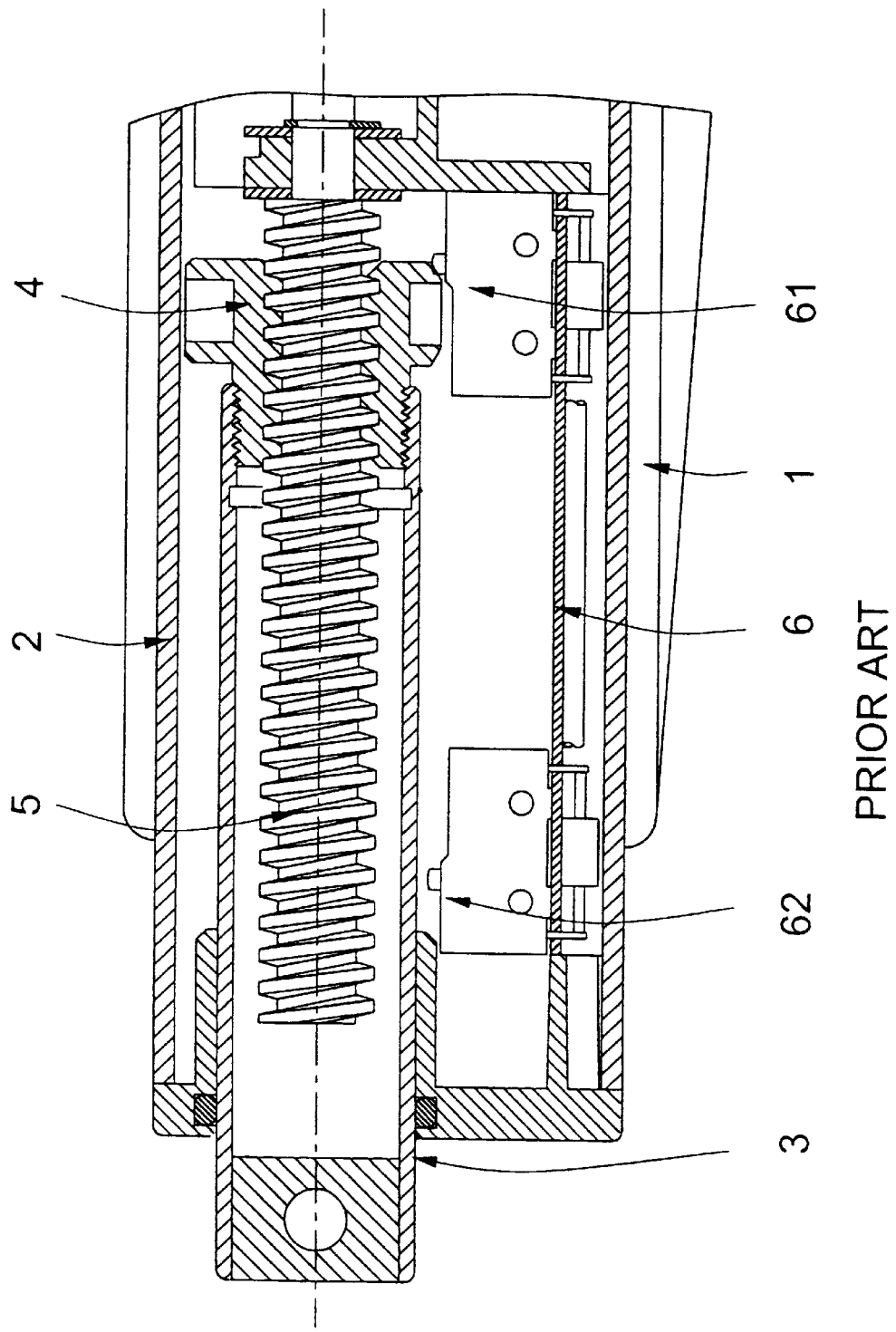
FIG. 5 shows the prior art of an actuator with limit switches assembled inside the external tube
Figure 6:
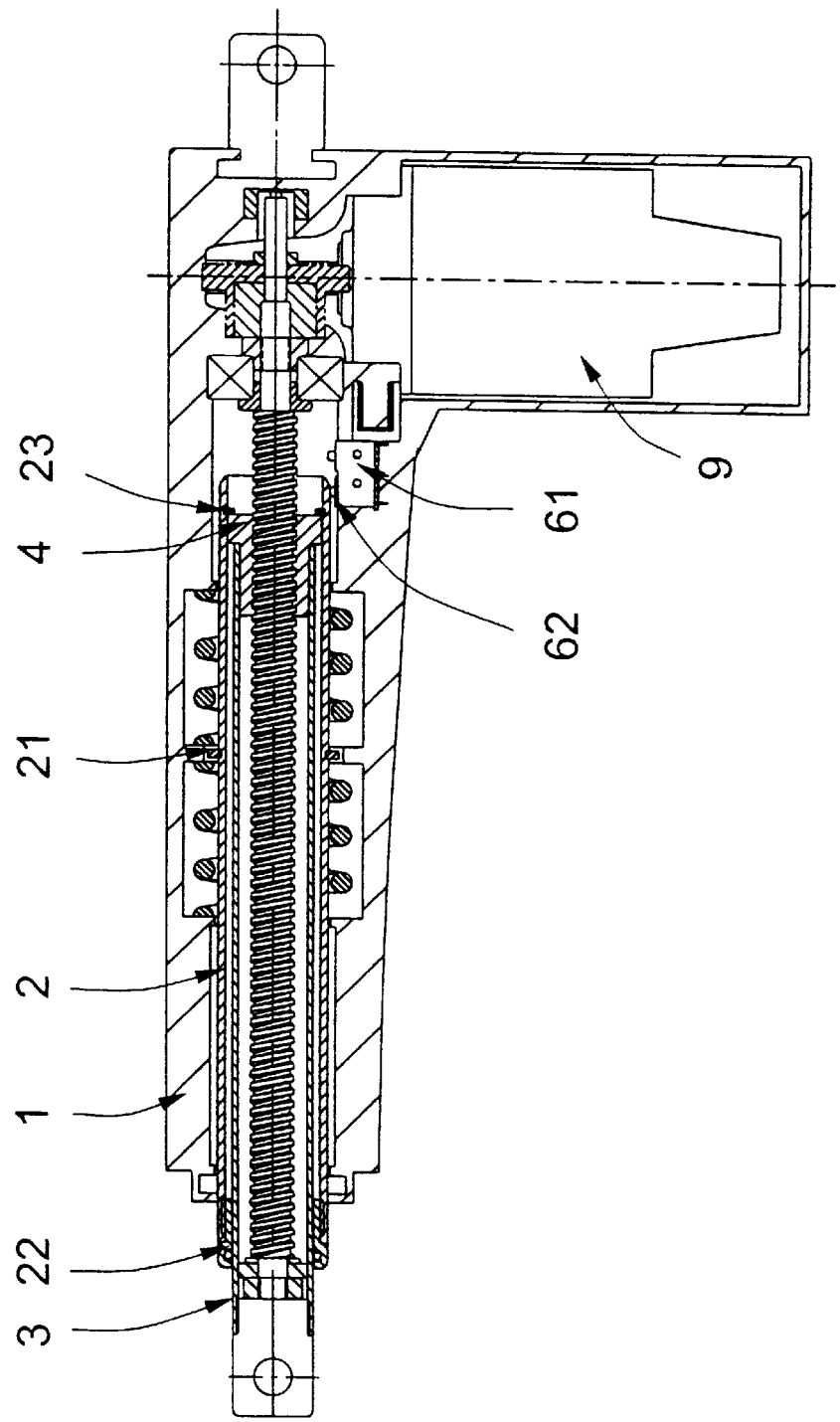
FIG. 6 shows another prior art of an actuator with limit switches.
Figure 7:
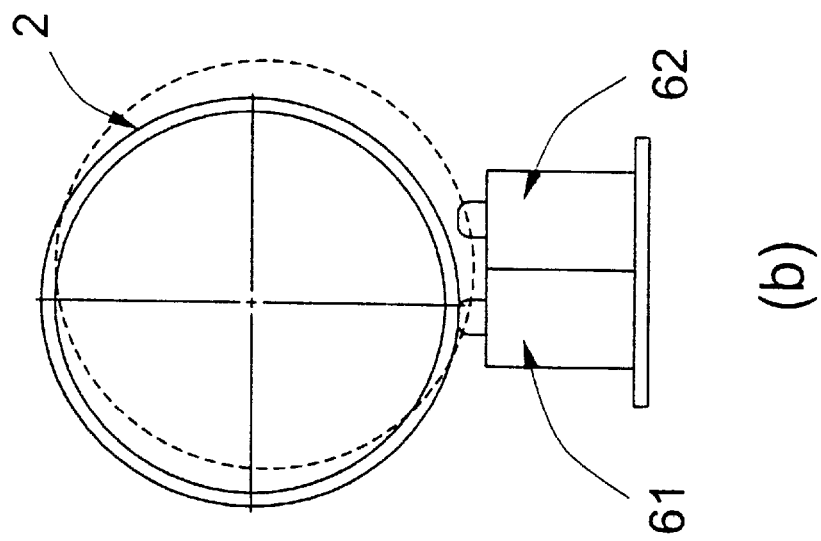
FIG. 7 shows the displacement of external tube in the actuator as shown in FIG. 6 subjected to a vertical load.
Figure 7:
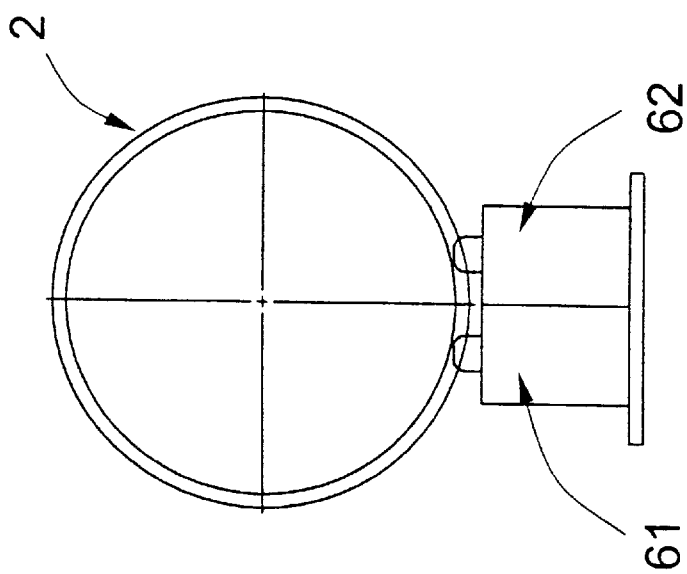

Trigger buttons of the limit switches on circuit board 6 are purposely arranged in a straight line, as shown in FIG. 4, which is parallel to the axis of the external tube. With this particular arrangement, the activities of these limit switches, if compared to existing solutions, are less sensitive to vertical deformation of the external tube as well as to the assembly tolerance between the limit switches, the screw nut and the external tube.

In this preferred embodiment, limit switches are used to implement travel limit function. This overcomes drawback of motor over-current approach in which travel limit function is not reliable. Since the two limit switches and its control circuit are positioned outside the external tube, dimension of the external tube and the actuator can be drastically reduced. The housing is designed to have two insert slots and a protrusion pad so that limit switches module can be easily inserted into the housing, which reduces assembly cost and time. When the travel limit positions are changed, only dimension of the screw shaft and external tube should be altered, the limit switches, and its control circuit need not be modified as what stated in the prior art.

Having described the preferred embodiment of this invention with reference to the attached drawings, it is understood that this invention is not only limited to the mentioned embodiments, and various changes and modifications may be affected therein by one skilled in the art without departing from the scope or spirit of the invention as defined in the appended claims.

What is claimed is:

1. A linear actuator with travel limit function comprising:
   a motor providing power to the linear actuator;
   a screw shaft driven by said motor;
   a screw nut converting rotary motion of said screw shaft into linear motion;
   a driving tube engaged with said screw nut and moves linearly;
   an external tube, surrounding said driving tube;
   a housing;
   a circuit board being inserted into said housing;
   two limit switches being mounted on said circuit board;
   one of said limit switches being used to control the travel limit during an extending movement of said driving tube, and remains in contact with said external tube while the actuator is not in an extended limit position;
   the other of said limit switches being used to control the travel limit during a shortening movement of said driving tube, and does not contact with said screw nut while the actuator is not in a retracted limit position;
   a spring clip in a groove of said external tube, and one side of said spring clip engaging said housing;
   a compressing spring engaging another side of said spring clip and disposed in a chamber of said housing;
   said spring clip, by pressing said compressing spring, will permit said external tube to leave said extending limit switch when said driving tube reaches its extended limit position;
   said compressing spring, by pressing said spring clip, will maintain said external tube in contact with said extending limit switch when said driving tube is not in its extended limit position;
   said screw nut will actuate said shortening limit switch when said driving tube reaches its retracted limit position, and will not actuate said shortening limit switch when the actuator has not reached its retracted limit position.

2. The actuator with travel limit function according to claim 1, wherein said extending and shortening limit switches have similar dimension, and said shortening limit switch is mounted on a spacer on said circuit board, and has a higher position than said extending limit switch if measured with respect to said circuit board.

3. The actuator with travel limit function according to claim 1, wherein at the final assembly stage, said shortening and extending limit switches are separated by a protrusion pad on said housing.

* * * * *